(12) United States Patent
Boss et al.

(10) Patent No.: US 6,780,210 B2
(45) Date of Patent: Aug. 24, 2004

(54) PROCESS FOR FORMING A FUEL PRODUCT FROM PAPER MILL SLUDGE

(76) Inventors: Edward E. Boss, 13700 Veterans Memorial, Suite 380, Houston, TX (US) 77014-1017; Samuel L. Shepherd, 13700 Veterans Memorial, Suite 380, Houston, TX (US) 77014-1017

( * ) Notice: Subject to any disclaimer, the term of this patent is extended or adjusted under 35 U.S.C. 154(b) by 630 days.

(21) Appl. No.: 09/808,078

(22) Filed: Mar. 15, 2001

(65) Prior Publication Data

US 2001/0025448 A1 Oct. 4, 2001

Related U.S. Application Data

(63) Continuation-in-part of application No. 09/499,325, filed on Feb. 7, 2000, now Pat. No. 6,214,064, which is a continuation-in-part of application No. 09/092,579, filed on Jun. 5, 1998, now Pat. No. 6,056,880, which is a continuation-in-part of application No. 08/910,849, filed on Aug. 13, 1997, now Pat. No. 5,868,942.

(51) Int. Cl.[7] .............................. C10L 5/00; C10L 5/48
(52) U.S. Cl. ............................. 44/577; 44/580; 44/590; 44/593; 44/595; 44/598; 44/605
(58) Field of Search .......................... 44/577, 580, 590, 44/593, 595, 598, 605

(56) References Cited

U.S. PATENT DOCUMENTS 5,505,774 A * 4/1996 Manning .................... 106/697
5,868,942 A * 2/1999 Boss et al. .................. 210/750
5,897,700 A * 4/1999 Manning .................... 106/697
6,056,880 A * 5/2000 Boss et al. .................. 210/695
6,123,856 A * 9/2000 Kumpera et al. ........... 210/727

* cited by examiner

Primary Examiner—Cephia D. Toomer
(74) Attorney, Agent, or Firm—Harrison & Egbert

(57) ABSTRACT

A process for making a fuel product from paper mill sludge including dewatering the paper mill sludge so as to have a solids content of greater than 7 percent by weight, mixing an oxide-containing chemical and molasses with the dewatered paper mill sludge, pressurizing the mixed sludge to a pressure of greater than 6 p.s.i. for a period of time of no less than 15 seconds, and drying the pressurized mixed sludge to no less than 60 percent solids by weight. The oxide-containing chemical can be either calcium oxide or calcium hydroxide. The oxide-containing chemical is mixed in an amount of between 1 percent to 10 percent by weight of the dewatered paper mill sludge. The molasses is mixed in an amount of between 0.1 percent and 1 percent by weight of the dewatered paper mill sludge. The method also includes grinding the dried sludge to a desired size of no less than 325 mesh and no larger than one-quarter inch in diameter. The dried sludge has a heating content of no less than 5,000 BTUs/pound.

20 Claims, 1 Drawing Sheet

PROCESS FOR FORMING A FUEL PRODUCT FROM PAPER MILL SLUDGE

CROSS REFERENCE TO RELATED APPLICATIONS

The present application is a continuation-in-part of U.S. patent application Ser. No. 09/499,325, filed on Feb. 7, 2000, and entitled "Process for Making a Fuel Product from Coal Fines and Sewage Sludge", now U.S. Pat. No. 6,214,064. U.S. application Ser. No. 09/499,325 was a continuation-in-part of U.S. patent application Ser. No. 09/092,579, filed on Jun. 5, 1998, and entitled "Process for Treating a Waste Sludge of Biological Solids". This patent issued as U.S. Pat. No. 6,056,880 on May 2, 2000. U.S. patent application Ser. No. 09/092,579 was a continuation-in-part of U.S. patent application Ser. No. 08/910,849, filed on Aug. 13, 1997, and entitled "Process for Treating a Waste Sludge of Biological Solids". This patent issued as U.S. Pat. No. 5,868,942, on Feb. 9, 1999.

BACKGROUND OF THE INVENTION

1. Field of the Invention

The present invention relates to the recovery of paper mill waste sludge. More particularly, the present invention relates to the production of high heating value fuel products from the dredged and dewatered paper mill sludge.

2. Description of Related Art

Paper is conventionally made by draining a low consistency dispersion of cellulose fiber pulp, fillers and additives through a paper machine "wire" (essentially an endless mesh or sieve). A certain amount of solid material passes through the wire with the suspending water, thus it is not retained in the wet paper web formed on the wire. The drained suspension water and suspended solid material is known as "white water" and is reused as far as practicable. Complete recovery and reuse of water and papermaking raw materials is impossible, and a certain proportion is discharged as effluent. Waste also occurs when the type or grade of paper being produced alters, especially if this involves a color change or the use of different additives or fillers.

Effluent from the paper machine has to be treated before it can be discharged from the mill. This treatment normally involves passage through a clarifier, prior to which flocculants are added to promote sedimentation of solid material. A biological treatment with microorganisms is often carried out in order to reduce the biological oxygen demand of the liquid effluent before it is discharged.

The sediment which accumulates is disposed of as a sludge composed of pulp fibers, fiber particles ("fines"), fillers and pigments, together with miscellaneous debris such as grit, sand, plastic particles, general dirt and, particularly if waste paper has been used by the mill as a raw material, ink particles, accumulations of adhesives and foreign bodies. The paper mill sludge is accumulated in the form of a pond or kept within a large open-air tank. Paper mill sludge has substantially little use as a material that can be employed in any other industrial applications. Because of its non-utility, the paper mill sludge is merely discarded, along with other waste cellulosic fiber, creating a tremendous disposal problem.

In certain circumstances, the sludge is drawn off from the pond or tank at about 2.5 percent consistency and then is dewatered to a consistency of around 20 to 25 percent, by means of rotary vacuum filters. It is then semi-solid and is collected for transport and disposal, such as into landfill sites. This is expensive, since a medium to large paper mill can generate thousands of tons of sludge for disposal each year. Landfill and associated transport costs can be expected to increase as landfill sites become scarce.

Attempts have been made to find economic uses for paper mill sludges which avoid the need for landfill or other disposal, and/or to recover reusable raw materials from the sludges. Some sludges can be burned for steam and/or power generation, but the practicality of this depends on the nature, amount and variability of the sludge produced. For example, sludges with a high filler content, as might be produced in a paper mill specializing in fine paper production, may not be adequately combustible, and/or the amount of sludge available may not justify investment in a suitable combustion plant or adaptation of existing plants.

The paper mill sludge can contain toxic chemicals and elements within the waste cellulosic fiber. The products typically containing dioxins are a major source of toxic contamination of soils and water supplies. Dioxins are suspected of causing cancer and birth defects. From the beginning of the industrial age, large quantities of materials containing dioxins have been dumped, either accidentally or deliberately, in a heretofore entirely reckless fashion. Consequently, material containing dioxins is a significant hazard to the environment. The disposal of all materials containing dioxins, and particularly paper mill sludge, has caused great concern. Incineration has been employed as a means of disposal and land burial has been the other primarily practiced method of disposal of waste cellulosic fiber and paper mill sludge.

It is an object of the present invention to provide a process which effectively converts the paper mill sludge into a usable fuel product.

It is another object of the present invention to provide a process whereby the paper mill sludge can be suitably pelletized for transportation and burning.

It is another object of the present invention to provide a process for forming a fuel product which produces a fuel product having a heating value of greater than 5,000 BTU/pound from paper mill sludge.

It is another object of the present invention to provide a process for treating paper mill sludge which effectively removes the harmful effects of dioxins.

It is still another object of the present invention to provide a process for making a high heating value fuel product from paper mill sludge which is easy to use, relatively inexpensive and economically beneficial.

These and other objects and advantages of the present invention will become apparent from a reading of the attached specification and appended claims.

BRIEF SUMMARY OF THE INVENTION

The present invention is a process for making a fuel product from paper mill sludge comprising the steps of: (1) dewatering the paper mill sludge so as to have a solids content of greater than 7 percent by weight; (2) mixing an oxide-containing chemical and molasses with the dewatered paper mill sludge; (3) pressurizing the mixed sludge to a pressure of greater than 6 p.s.i. for a period of time of no less than 15 seconds; and (4) drying the pressurized mixed sludge to no less than 60 percent solids by weight.

Within the process of the present invention, the paper mill sludge is dredged prior to the step of dewatering. The oxide-containing chemical can be either calcium oxide or calcium hydroxide in an amount of between 1 to 10 percent by weight of the dewatered paper mill sludge. The molasses is mixed in an amount of between 0.1 percent and 1 percent by weight of the dewatered paper mill sludge. The step of pressurizing is carried out between 6 p.s.i. and 500 p.s.i.

Within the process of the present invention, the pressurized mixed sludge is passed to a flashing chamber and then to a drying field. The dried sludge can then be ground to a desired mesh size of no less than 325 mesh and no larger than one-quarter inch. The dried sludge will have a heating value of no less than 5,000 BTU/lb.

The step of pressurizing includes passing the mixed sludge as a flow through a pipe. The pipe maintains the mixed sludge at a pressure of greater than 6 p.s.i. The pipe has a length such that the flow of the mixed sludge takes longer than 15 seconds to pass through the pipe. The pressurized mixed sludge can then be flashed from the pipe through an orifice in the pipe into a flash chamber having a pressure therein of less than 6 p.s.i.

DETAILED DESCRIPTION OF THE INVENTION

Figure 1:
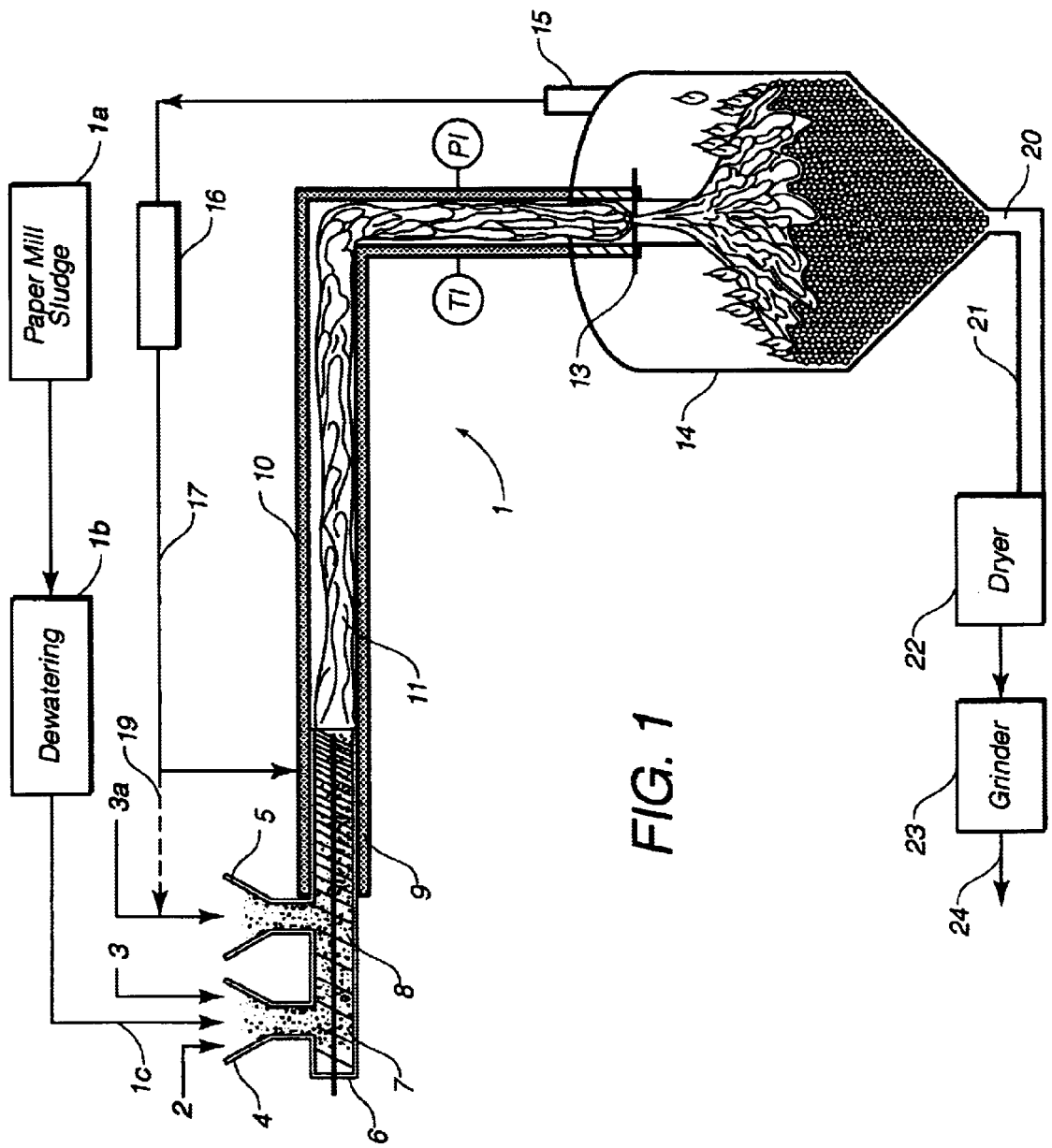
FIG. 1 is a flow diagram showing the process of the present invention in accordance with the preferred embodiment of the present invention.

Paper mill sludge is a byproduct of the production of paper and typically is an environmental contaminant. The disposal of paper mill sludge has been an ecological problem throughout the world. One deleterious aspect of paper mill sludge is that it typically contains harmful chemical contaminants that have been identified as a potential cause of cancer and birth defects. Heretofore utilized methods of disposing of paper mill sludge have been unacceptable since the typical methods have included burning or burial. Burning the paper mill sludge is an expensive method of disposal since the paper mill sludge is difficult to handle subsequent to being dredged. Burial of the material only conceals the contaminants therein. The contaminants can leak into groundwater and remain as constant potential environmental hazards.

The composition of paper mill sludge varies slightly depending upon the particular manufacture from which it is obtained. Paper mill sludge generally comprises cellulosic fibrous materials, water and fillers, in addition to contaminants. Normal paper mill sludge has a solids content of 40 to 90 weight percent fiber (the fibers are typically 500 to 1,000 microns in length) and 10 to 60 weight percent filler. Fillers include such materials as kaolin clay, baryites, titanium dioxide and other plant fibers. Raw paper mill sludge has a usual water content ranging from 60 to 90 weight percent. As used herein, the term "paper mill sludge" encompasses byproducts of the production of paper as described above, mixtures of said byproducts and waste cellulosic fibrous material, slurried waste cellulosic fibrous material and slurried plant fibrous materials.

Lime is derived through the decarbonation of limestone. It is manufactured by calcining (burning) high purity calcitic or dolomitic limestone at temperatures ranging from 900° C. to 1,320° C. The calcination process drives off most of the carbon dioxide forming calcium oxide or "quicklime", which can be hydrated to form hydrated lime or calcium hydroxide. Lime is consumed in a variety of diverse markets including water and waste treatment, metallurgy, environmental applications, and in the pulp and paper, construction, agriculture and chemical industries. Commercial quicklimes are most often classified as either a high calcium quicklime or a dolomitic quicklime. Both high calcium quicklimes and dolomitic quicklimes have calcium oxide as the primary component. As used herein, the term "calcium oxide" encompasses materials derived through the calcination of limestone including pure calcium oxide and high calcium and dolomitic quicklimes and further including chemicals produced by the calcination process followed by hydration such as hydrated lime or calcium hydroxide.

When calcium oxide is added to paper mill sludge, an exothermic reaction occurs. The heat of reaction, and primarily the hydrolyzation of the calcium oxide, helps absorb excess moisture from the sludge. The fibrous material contained in the sludge absorbs the excess heat of the exothermic reaction and expands from a compacted state to break down into a very fine fiber that will accept and hold additional materials. The addition of calcium oxide to the paper mill sludge also raises the pH of the sludge to 10.5 to 11. This excess alkalinity treatment works to disinfect the mixture against bacteria and some virus types. It also removes most heavy metals. The reaction of calcium oxide combined with the effect of exothermically generated heat successfully treats the water absorbed by activating the blotting effect of paper fiber, neutralizing all phenolic components and coating any heavy metals.

Paper mill sludge is also known to have an objectionable odor. The addition of calcium oxide to paper mill sludge reduces odor because of the high pH established. Stabilizing the sludge with calcium oxide reduces the number of odor-producing bacteria.

FIG. 1 is an illustration of the BIOSET (TM) process 1 as used with the treatment of paper mill sludge. In the BIOSET (TM) process 1, the paper mill sludge 1a is suitably dredged and passed to a dewatering step 1b. The dewatering step 1b can be carried out by a suitable conveyor system whereby the sludge is placed thereon so that the water associated with the sludge is drained out. During the dewatering step 16, it is important that the dewatered sludge have a solids content in excess of 7 percent by weight. The dewatered sludge is delivered for processing so as to produce a high-heating value fuel product and a heating value in excess of 5,000 BTU/lb. In the BIOSET (TM) process 1, the dewatered sludge 1c, molasses 2 and an oxide-containing chemical 3 are delivered together into a feed hopper 4. The dewatered sludge 1c has a solids content of greater than 7 percent or a water content of less than 93 percent. It is important for the dewatered sludge 1c to have a water content such that the remaining chemicals introduced to the process can properly react with the sludge.

In the present invention, molasses 2 is introduced into the feed hopper 4. Typically, molasses is derived from sugar cane syrup or sorghum production. Molasses has a heating content of 18,000 BTU per pound. As such, the use of molasses adds significantly to the BTU content of the fuel product. The molasses is added to the feed hopper 4 in an amount of between 0.1 percent to 1 percent by weight of the dewatered sludge.

As used in the present invention, the oxide-containing chemical 3 could be either calcium oxide or calcium hydroxide, as defined hereinabove. The oxide-containing chemical 3 is added to the feed hopper 4 in an amount between 1 percent to 10 percent by weight of the dewatered paper mill sludge 1c. In the preferred embodiment of the present invention, the oxide-containing chemical is calcium oxide added in an amount of approximately 6 percent by weight of the dewatered paper mill sludge 1c.

After the sludge 1c, the molasses 2 and the oxide-containing chemical 3 are added together into the feed hopper 4, the mixture is auger fed into the feed section 7 of a screw conveyor 6. The screw conveyor 6 will rotate so as to transport the mixture of the sludge 1c, the molasses 2, and the oxide-containing chemical 3 to a feed section 8. During the transport of the mixture, the sludge 1c, the molasses 2 and the oxide-containing chemical 3 are mixed together by the screw conveyor 6. Other ingredients 3a can be added to the feed section 8, if desired. These other ingredients could be passed along with the other materials or otherwise delivered into the feed section 8. These materials are then transported into the compression zone in the reaction chamber 9 of the screw conveyor 6. This compression zone in the reaction chamber 9 serves to increase the pressure of the mixed sludge to the desired value. Specifically, the compression zone in the reaction chamber 9 should increase the pressure of the mixed sludge to a pressure of greater than 6 p.s.i.a. and no more than 500 p.s.i.a. The higher pressures cause the reactions to happen much faster so as to increase the density of the product. At the high pressures, the sugar in the molasses will react with the lime to form sucrose. The sucrose will act as a binding agent. The calcium sucrose will cause the fibers within the paper mill sludge and the lime to form soft fluffy particles. The sugar and the lime will act as suitable binding agents so that a solid product is produced.

The adding of the oxide-containing chemical 3 and the increase in a pressure through the motive force of the screw conveyor 6 causes an exothermic reaction along the reaction chamber 9. The combination of calcium oxide and the water within the paper mill sludge produces calcium hydroxide and liberates 235 kcal/mole of heat. This reaction will raise the temperature of the pressurized mixed sludge.

The material which exits the screw conveyor 6 enters pipe 11 having insulation 10 extending therearound. This pipe 11 can contain static mixing elements. The material is continuously mixed as it progresses through the predetermined length of the pipe. The material is continuously under pressure within the pipe 11 so as to prevent a premature flashing of the water within the mixed sludge. The mixed sludge will flow through the length of the pipe 11. The pipe 11 should be sized so as to have a length and diameter such that the flow of the mixed sludge will continue through the pipe for a period of no less than 15 seconds.

After reacting within the pipe 11, the mixed sludge is flashed across a restricting orifice 13. This restricting orifice 13 can be an opening, a die or a valve. The orifice 13 is positioned generally adjacent to the end of the pipe 11. The orifice 13 will communicate with a flash chamber 14. As such, the material is delivered under pressure to the orifice 13 and then released into the flash chamber 14. A vapor will exit the flash chamber 14 through the vent 15. This vapor can then pass to a container 16. The products of the process can then be sold as valuable byproducts external of the system. Alternatively, the products of the process can be passed along line 17 so as to be recycled (as a component or as a heat exchange fluid to the reaction chamber 9). The products can be introduced as a component 19 of the other ingredients 3a into the second feed hopper 5.

In order to properly remove the water from the sludge, it is important that the flash chamber have an interior pressure less than that of the pressure within the pipe 11, i.e. less than 6 p.s.i. As such, when the mixed sludge passes through orifice 13, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps or vapor compressors. After the sludge passes into the flash chamber 14, the resulting sludge will be generally free of dioxins by way of the alkaline stabilization. The product will be warm and moist and in the form of wet cakes.

The sludge will then exit the flash chamber 14 through the discharge opening 20. The end product exiting the flash chamber 14 will then be passed along pipe 21 to a dryer 22. The dryer 22 can be a mechanical dryer or can be a drying field. In the drying field, the cakes of the sludge will be suitably dried until the cakes have at least a 60 percent solids content. The dried cakes of sludge will have a heating content of in excess of 5,000 BTUs per pound. The cakes can then be delivered to a grinder 23. Grinder 23 will grind the cakes so as to be in the form of particles similar to wood chips or sawdust. In particular, the particle should have a size of no less than 325 mesh and no larger than one-quarter inch. One hundred percent of the particles should fall between these levels. If the particles are too fine, then there is the risk that the particles will blow away in the form of dust. The end product from the grinder 23 can be passed outwardly along line 24 so as to be burned in a furnace, or otherwise, as a high heating value fuel product. As a result, the paper mill sludge of the present invention is properly reused as a fuel product.

On tests conducted with the process of the present invention, the end product had a heat of combustion in excess of 5,000 BTUs per pound. Since the BTUs per pound is in excess of 5,000 BTUs per pound, the end product of the process of the present invention can be eligible for the alternative fuel tax credit. Additionally, such a BTU content will allow the end product to be suitably burned in a coal-fired plant or in a combustion chamber. As such, the paper mill sludge can be disposed of by burning in the form of a valuable fuel product. The present invention accomplishes the purpose of disposal and of producing a valuable and marketable fuel product simultaneously. The drying and grinding process allows the resulting product to be easily transported and stored without the production of dust or other unwelcome byproducts.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A process for making a fuel product from paper mill sludge comprising:

dewatering the paper mill sludge so as to have a solids content of greater than 7 percent by weight;

mixing an oxide-containing chemical and molasses with the dewatered paper mill sludge;

pressurizing the mixed sludge to a pressure of greater than 6 p.s.i. for a period of time of no less than fifteen seconds; and drying the pressurized mixed sludge to no less than 60 percent solids by weight.

2. The process of claim 1, further comprising:

dredging the paper mill sludge prior to said step of dewatering.

3. The process of claim 1, said oxide-containing chemical being selected from the group consisting of calcium oxide and calcium hydroxide.

4. The process of claim 1, said oxide-containing chemical being mixed in an amount of between 1 percent to 10 percent by weight of the dewatered paper mill sludge.

5. The process of claim 4, said oxide-containing chemical being mixed in an amount of approximately 6 percent by weight of the dewatered paper mill sludge.

6. The process of claim 1, said molasses being mixed in an amount of between 0.1 percent and 1 percent by weight of the dewatered paper mill sludge.

7. The process of claim 1, said step of pressurizing being no more than 500 p.s.i.

8. The process of claim 1, said step of drying comprising:
passing the pressurized mixed sludge to a drying field.

9. The process of claim 1, further comprising:
grinding the dried sludge to a desired mesh size.

10. The process of claim 9, said desired mesh size being no less than 325 mesh and no larger than one-quarter inch in diameter.

11. The process of claim 1, said dried sludge having a heating value content of no less than 5,000 BTUs/pound.

12. The process of claim 1, said step of pressurizing comprising:
passing the mixed sludge as a flow through a pipe, said pipe maintaining the mixed sludge at a pressure of greater than 6 p.s.i., said pipe having a length such that the flow of the mixed sludge takes longer than 15 seconds to pass through said pipe.

13. A process for making a fuel product from paper mill sludge comprising:
mixing molasses and an oxide-containing chemical with the paper mill sludge, said sludge containing fibers therein and having a solids content of greater than 7 percent by weight;
pressurizing the mixed sludge to a pressure of between 6 and 500 p.s.i. for a period of time no less than 15 seconds; and
drying the pressurized mixed sludge.

14. The process of claim 13, said oxide-containing chemical being selected from the group consisting of calcium oxide and calcium hydroxide.

15. The process of claim 14, said oxide-containing chemical being mixed in an amount of between 1 percent to 10 percent by weight of the dewatered paper mill sludge.

16. The process of claim 14, said molasses being mixed in an amount of between 0.1 percent and 1 percent by weight of the paper mill sludge.

17. The process of claim 13, said step of drying comprising:
drying the pressurized mixed sludge in a drying field to no less than 60 percent solids by weight.

18. The process of claim 13, said step of pressurizing comprising:
passing the mixed sludge as a flow through a pipe, said pipe maintaining the mixed sludge at a pressure of between 6 and 500 p.s.i., said pipe having a length such that the flow of the mixed sludge takes longer than 15 seconds to pass through said pipe.

19. The process of claim 18, further comprising:
flashing the pressurized mixed sludge through an orifice in said pipe into a flash chamber having a pressure therein of less than 6 p.s.i.

20. The process of claim 13, further comprising:
grinding the dried sludge to a size of no less than 325 mesh and no larger than one-quarter inch in diameter.

* * * * *